US012563161B2

(12) United States Patent
Aoyagi et al.

(10) Patent No.: US 12,563,161 B2
(45) Date of Patent: Feb. 24, 2026

(54) NETWORK MANAGEMENT FOR UTILIZING SURVEILLANCE CAMERA

(71) Applicant: Rakuten Mobile, Inc., Tokyo (JP)

(72) Inventors: Kenichiro Aoyagi, Tokyo (JP); Jin Kusumi, Tokyo (JP); Takuya Miyazawa, Tokyo (JP)

(73) Assignee: Rakuten Mobile, Inc., Setagaya-ku (JP)

( * ) Notice: Subject to any disclaimer, the term of this patent is extended or adjusted under 35 U.S.C. 154(b) by 63 days.

(21) Appl. No.: 18/035,979

(22) PCT Filed: Jan. 27, 2023

(86) PCT No.: PCT/JP2023/002597
§ 371 (c)(1),
(2) Date: May 9, 2023

(87) PCT Pub. No.: WO2024/157447
PCT Pub. Date: Aug. 2, 2024

(65) Prior Publication Data
US 2024/0406350 A1      Dec. 5, 2024

(51) Int. Cl.
*H04N 7/18* (2006.01)
*G08B 25/00* (2006.01)
(52) U.S. Cl.
CPC ............. *H04N 7/181* (2013.01); *G08B 25/00* (2013.01)
(58) Field of Classification Search
None
See application file for complete search history.

(56) References Cited

U.S. PATENT DOCUMENTS

| | | | |
|---|---|---|---|
| 8,456,532 B1* | 6/2013 | Petkevich | ........ H04N 21/64738 |
| | | | 348/207.1 |
| 2004/0111508 A1* | 6/2004 | Dias | ...................... H04L 41/142 |
| | | | 709/224 |
| 2009/0158364 A1* | 6/2009 | Swamidas | ............ G08B 25/009 |
| | | | 348/211.3 |
| 2019/0080577 A1* | 3/2019 | Raz | .......................... G01H 3/10 |
| 2021/0258762 A1* | 8/2021 | Aoyagi | ................. H04W 88/14 |
| 2022/0103620 A1 | 3/2022 | Miyamura | |
| 2022/0295252 A1* | 9/2022 | Malone | ................. H04W 76/11 |
| 2023/0092448 A1* | 3/2023 | Ito | ......................... H04W 24/08 |
| | | | 455/67.11 |
| 2024/0080363 A1* | 3/2024 | Wang | ...................... H04L 67/12 |

FOREIGN PATENT DOCUMENTS

| | | |
|---|---|---|
| JP | 2002-298261 A | 10/2002 |
| JP | 2012-037952 A | 2/2012 |
| JP | 2018-160017 A | 10/2018 |
| JP | 2022-059106 A | 4/2022 |
| JP | 2022-103875 A | 7/2022 |

* cited by examiner

*Primary Examiner* — Eileen M Adams
(74) *Attorney, Agent, or Firm* — Sughrue Mion, PLLC

(57) ABSTRACT

An edge server executes reception processing, control processing, and image transmission processing. The reception processing is for receiving, from a base station that has detected an emergency state, information indicating the emergency state via a core network connected to the base station. The control processing is for controlling, upon receiving information indicating the emergency state, one or more surveillance cameras connected to the base station. The image transmission processing is for transmitting images captured by the one or more surveillance cameras to an external apparatus via the core network.

10 Claims, 8 Drawing Sheets

NETWORK MANAGEMENT FOR UTILIZING SURVEILLANCE CAMERA

CROSS REFERENCE TO RELATED APPLICATIONS

This application is a National Stage of International Application No. PCT/JP2023/002597 filed Jan. 27, 2023.

TECHNICAL FIELD

The present disclosure relates to network management for utilizing surveillance cameras that are geographically installed.

BACKGROUND ART

In recent years, surveillance cameras are installed in many areas including indoor and outdoor areas. The images (including videos) captured by surveillance cameras are utilized for crime prevention and tracking investigation, for example. In general, the images captured by surveillance cameras are once saved, and thereafter are used. For example, in Patent Literature Document 1, a crime prevention system is disclosed in which a plurality of videos captured by a plurality of cameras provided in outdoor areas are saved, and the saved videos are provided to a communication terminal authenticated in accordance with a predetermined procedure.

LISTING OF REFERENCES

Patent Literature Documents

Patent Literature Document 1: JP 2022-103875A

SUMMARY OF THE INVENTION

Problems to be Solved by the Invention

As described in Patent Literature Document 1, in general, images captured by surveillance cameras are once saved, and the saved images are used for crime prevention and tracking investigation. On the other hand, there is need to utilize captured images in real time. For example, for a case that is currently happening, it is desirable to utilize captured images in real time for rapid investigation and analysis. However, when many surveillance cameras are installed in many areas including indoor and outdoor areas, transmitting an enormous amount of image data obtained from all of the surveillance cameras through a network greatly increases the network load. Therefore, in order to utilize, in real time, the images captured by surveillance cameras that are geographically arranged, network management is required for appropriately specifying a surveillance camera that captures images to be used, and efficiently transmitting images captured by the specified surveillance camera.

The present invention has been made in view of the above issue, and an object of the present disclosure is to provide a network management technique for utilizing, in real time, images captured by surveillance cameras that are geographically arranged.

Solution to the Problems

In order to solve the above-described issues, an edge server according to one aspect of the present disclosure includes one or more processors, and at least one of the one or more processors executes reception processing, control processing, and image transmission processing. The reception processing is for receiving, from a base station that has detected an emergency state, information indicating the emergency state via a core network connected to the base station. The control processing is for controlling, upon receiving information indicating the emergency state, one or more surveillance cameras connected to the base station. The image transmission processing is for transmitting images captured by the one or more surveillance cameras to an external apparatus via the core network.

In order to solve the above-described issues, a management apparatus according to one aspect of the present disclosure includes one or more processors, and at least one of the one or more processors executes reception processing, camera control processing, and image transmission processing. The reception processing is for receiving, from a base station that has detected an emergency state, information indicating the emergency state via a core network connected to the base station. The camera control processing is for controlling, upon receiving information indicating the emergency state, an edge server connected to the base station to control one or more surveillance cameras connected to the base station. The image transmission processing is for transmitting images captured by the one or more surveillance cameras to an external apparatus connected to the core network.

In order to solve the above-described issues, a control method of an edge server according to one aspect of the present disclosure includes receiving, from a base station that has detected an emergency state, information indicating the emergency state via a core network connected to the base station, controlling, upon receiving information indicating the emergency state, one or more surveillance cameras connected to the base station, and transmitting images captured by the one or more surveillance cameras to an external apparatus via the core network.

Advantageous Effects of the Invention

According to the technique disclosed in the present disclosure, the images captured by surveillance cameras that are geographically arranged can be utilized in real time.

BRIEF DESCRIPTION OF THE DRAWINGS

FIG. 3 shows a communication sequence for establishing an emergency session when an emergency call is transmitted from a UE.

FIG. 4 shows a communication sequence for an MEC server to acquire images by controlling surveillance cameras and to transmit the images to a PSAP.

FIG. 5 shows a communication sequence for a management apparatus to control the MEC server so as to acquire images by controlling surveillance cameras and to transmit the images to an PSAP.

DESCRIPTION OF EMBODIMENTS

Figure 1:
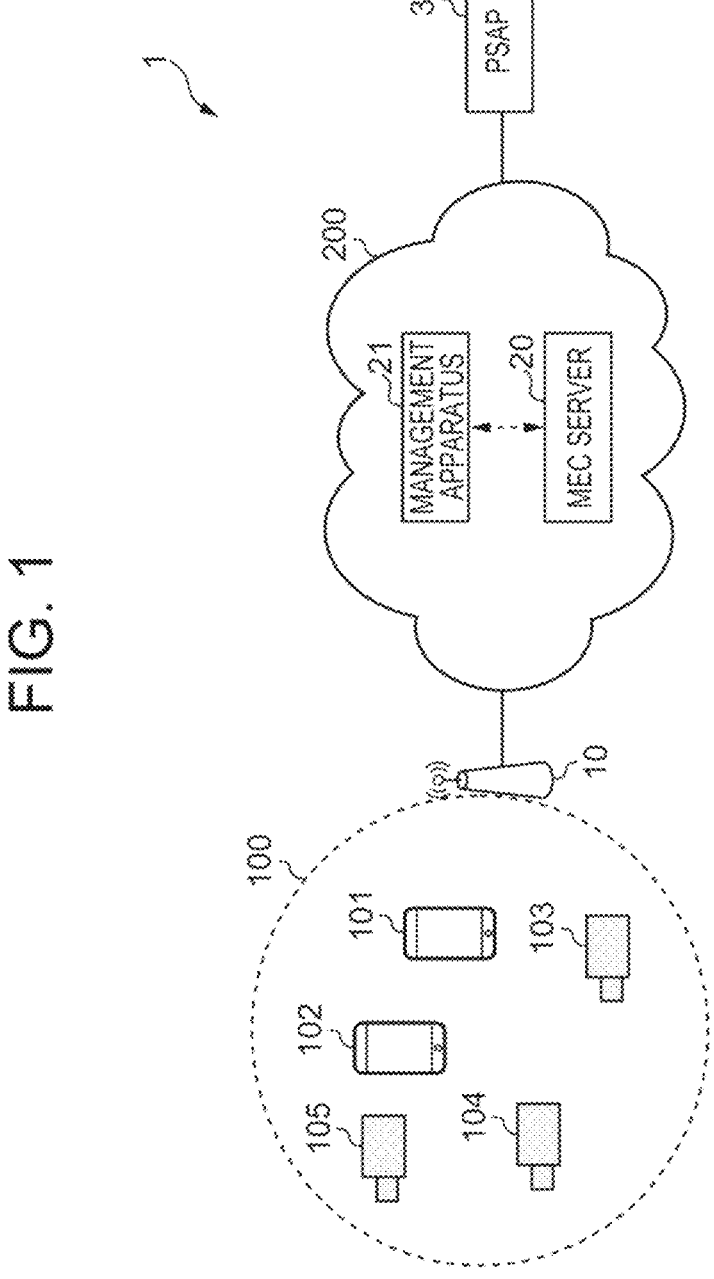
FIG. 1 shows an exemplary configuration of a communication system according to a first embodiment.

Hereinafter, embodiments of the present disclosure will be described in detail with reference to the accompanying drawings. Among the constituent elements disclosed below, those having the same functions are denoted by the same reference numerals, and descriptions thereof are omitted. Note that the embodiments disclosed below are one mode of the present disclosure, should be modified or changed as appropriate according to the device configuration and various conditions, and are not limited to only the following embodiments. Moreover, not all combinations of features described in the present embodiments are essential for solving the above issues.

In the embodiments disclosed below, a network (5G network) conforming to the fifth generation (5G) standardized in the Third Generation Partnership Project (3GPP (registered trademark)) is envisioned as the network to which the technique according to the present disclosure is applied. Note that the network mentioned here includes a user equipment. Note that the technique according to the present disclosure may also be applied to networks other than the 5G network.

First Embodiment

Configuration of Communication System

FIG. 1 shows an exemplary configuration of a communication system 1 according to the present embodiment. A base station 10 at least includes a device that functions as an RU (Radio Unit) that performs some of functions of a RAN (Radio Access Network). Also, the base station 10 forms a cell 100 to be managed by the base station 10. A plurality of user equipments (User Equipments (UEs)) 101 and 102 and a plurality of surveillance cameras 103 to 105 are present in the cell 100, and are wirelessly connected to the base station 10 through a wireless access network. Also, the UEs 101 and 102 and the surveillance cameras 103 to 105 are connectable to a public safety answering point (PSAP) 30 via the base station 10 and the network 200. The PSAP 30 is a local organization that performs emergency call connection, assesses the situation using received information, and provides emergency services (e.g., firefighting, emergency medical service, police). Note that at least one of the surveillance cameras 103 to 105 may not be directly connected to the base station 10, and may communicate with an unshown communication apparatus (e.g., IoT (Internet of Things) device) that is wirelessly connected to the base station 10. That is, at least one of the surveillance cameras 103 to 105 may be indirectly connected to the base station 10. The mode of communication between the at least one of the surveillance cameras 103 to 105 and the communication apparatus may be wireless connection such as Bluetooth (registered trademark), or may also be wired connection.

In the present embodiment, the network 200 includes a core network (5G core network) conforming to 5G. An exemplary configuration of the network 200 will be described later with reference to FIG. 2A. The network 200 includes a MEC server 20 and a management apparatus 21. The MEC server 20 is a server device (edge server) for edge computing (MEC in the present embodiment). Identification information for identifying the MEC server 20 is given to the MEC server 20. Note that the base station 10 may also have functions of the MEC server 20. Also, the management apparatus 21 may manage the MEC server 20. The management apparatus 21 acquires identification information of the MEC server 20 in advance, and manages the MEC server 20 based on the identification information.

The UEs 101 and 102 are communication apparatuses that may have a communication function conforming to 5G. The surveillance cameras 103 to 105 have an imaging function, and are able to directly or indirectly transmit image data (image packets) including captured images to the base station 10. Note that, in the present disclosure, the term "image" should be understood as a term that means at least one of a still image and a moving image (video). The surveillance cameras 103 to 105 may have a communication function conforming to 5G when directly connected to the base station 10.

In the present embodiment, the base station 10 acquires, in advance, information (camera information) such as the position, imageable range, and imaging magnification range from each of the surveillance cameras 103 to 105, and manages each piece of camera information in association with the identification information of the corresponding camera. Also, the base station 10 may share the camera information associated with identification information with the MEC server 20 and the management apparatus. Accordingly, the MEC server 20 and the management apparatus 21 can manage and operation-control the surveillance cameras 103 to 105 via the base station 10.

In the present embodiment, a case is envisioned in which a UE belonging to the cell 100 has transmitted an emergency call. For example, a case is envisioned in which a user (reporter) of the UE 101 has transmitted an emergency call (e.g., "110" in Japan) by operating the UE 101. When an emergency call has been transmitted from the UE 101, the base station 10 detects that the received call is an emergency call, that is, an emergency state, and notifies the PSAP 30 of the emergency state via the network 200. Also, the emergency state is notified to the MEC server 20 in the network 200, and the MEC server 20 controls the surveillance cameras 103 to 105 connected to the base station 10, and performs control such that images captured by the surveillance cameras are transmitted to the PSAP 30. Alternatively, the emergency state is notified to the management apparatus 21 in the network 200, and the management apparatus 21 controls the surveillance cameras 103 to 105 connected to the base station 10, and performs control such that images captured by the surveillance cameras are transmitted to the PSAP 30.

Note that, in FIG. 1, the number of UEs to be wirelessly connected to the base station 10 (that is, belonging to the cell 100) is two (UEs 101 and 102), but any number of UEs may be connected. Similarly, in FIG. 1, the number of surveillance cameras to be connected to the base station 10 is three (surveillance cameras 103 to 105), but any number of surveillance cameras may be connected. Also, in FIG. 1, only the PSAP 30 is connected to the network 200, but any external server or server system can be connected to the network 200.

Also, the exemplary network configuration in FIG. 1 shows a functional configuration, and does not necessarily show a physical configuration.

Figure 2A:
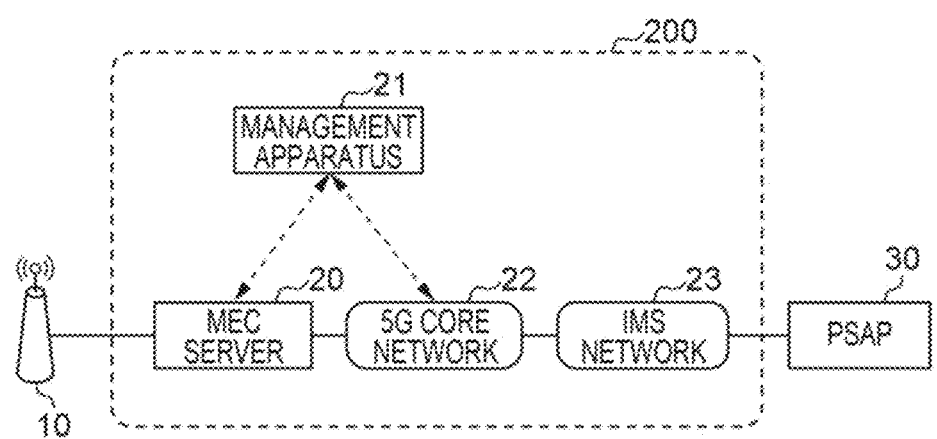
FIG. 2A shows an exemplary network configuration in the communication system.

FIG. 2A shows an exemplary configuration of the network 200 according to the present embodiment. The network 200 includes the MEC server 20, a 5G core network 22 that is a core network conforming to 5G, and an IMS (IP Multimedia Subsystem) network 23 that notifies the PSAP 30 of an emergency call from a UE wirelessly connected to the base station 10. The IMS network 23 may communicate with the PSAP 30. Also, the MEC server 20 may communicate with UEs and surveillance cameras that are connected to the base station 10 via the base station 10. Also, the management apparatus 21 may manage the MEC server 20 directly or indirectly via the 5G core network 22, for example. Note that the management apparatus 21 need only to manage the MEC server 20, and is not limited to being installed inside the network 200. Alternatively, a configuration may also be adopted in which at least some of functions of the management apparatus 21 are implemented in another device in the network 200. Alternatively, a configuration may also be adopted in which at least some of functions of the management apparatus 21 are implemented in another device, such as the PSAP 30, that is connected to the network 200.

Figure 2B:
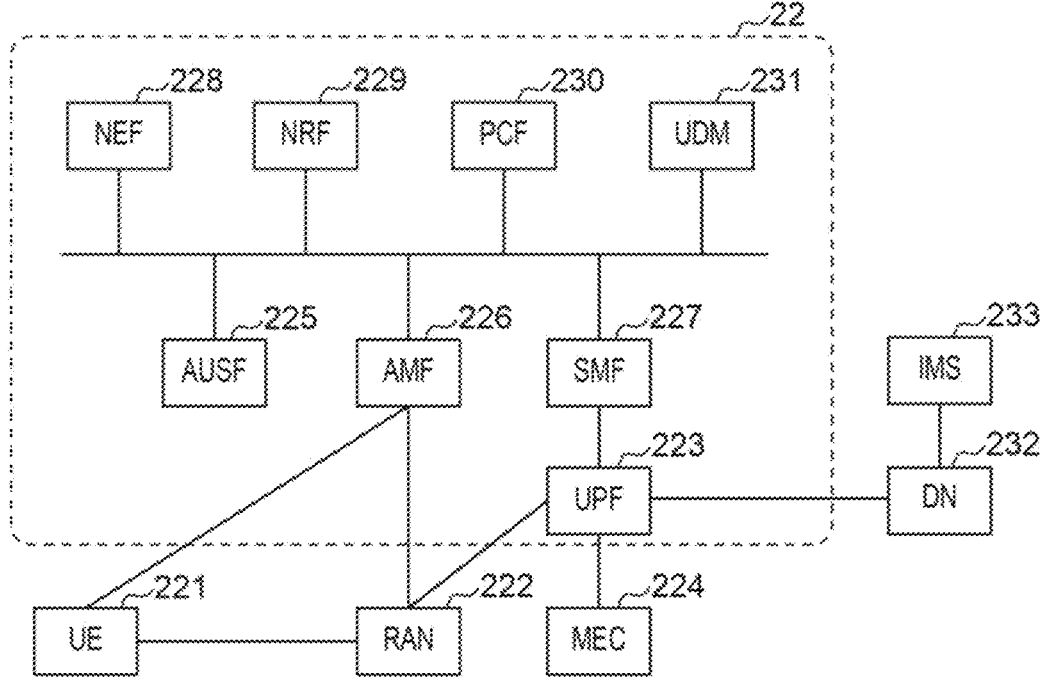
FIG. 2B shows an example of a 5G core network.

FIG. 2B schematically shows an example of the 5G core network 22. The 5G core network 22 shown in FIG. 2B includes a UPF (User Plane Function) 223, an AUSF (Authentication Server Function) 225, an AMF (Access and Mobility Management Function) 226, an SMF (Session Management Function) 227, an NEF (Network Exposure Function) 228, an NRF (Network Repository Function) 229, a PCF (Policy Control Function) 230, and a UDM (Unified Data Management) 231, and is to be connected to a UE 221 and an RAN 222. The UPF 223 is to be connected to an MEC 224. Also, the UPF 223 is to be connected to a DN (Data Network) 232, and the IMS 233 is to be connected to the DN 232. The UE 221 and the MEC 224 respectively correspond to the UE 101 or 102 and the MEC server 20 in FIG. 1. The RAN 222 includes the base station 10 in FIG. 1. The IMS 233 corresponds to the IMS network 23 in FIG. 2A.

As is understood with reference to FIGS. 2A and 2B, the IMS network 23 and the MEC server 20 are connected to the 5G core network 22 via the UPF 223.

With the configuration shown in FIGS. 1, 2A, and 2B, an emergency call transmitted by the UE 101 (or UE 102) wirelessly connected to the base station 10 is notified to the 5G core network 22 via the base station 10. Also, the 5G core network 22 notified of an emergency call recognizes that the emergency call is an emergency call from the cell 100 formed by the base station 10, and notifies at least one of MEC server 20 and the management apparatus 21 of an emergency state. Upon receiving the notification, the at least one of the MEC server 20 and the management apparatus 21 specifies the surveillance cameras 103 to 105 in the cell 100, and starts control.

Flow of Processing (When MEC Server Controls Surveillance Cameras)

Figure 3:
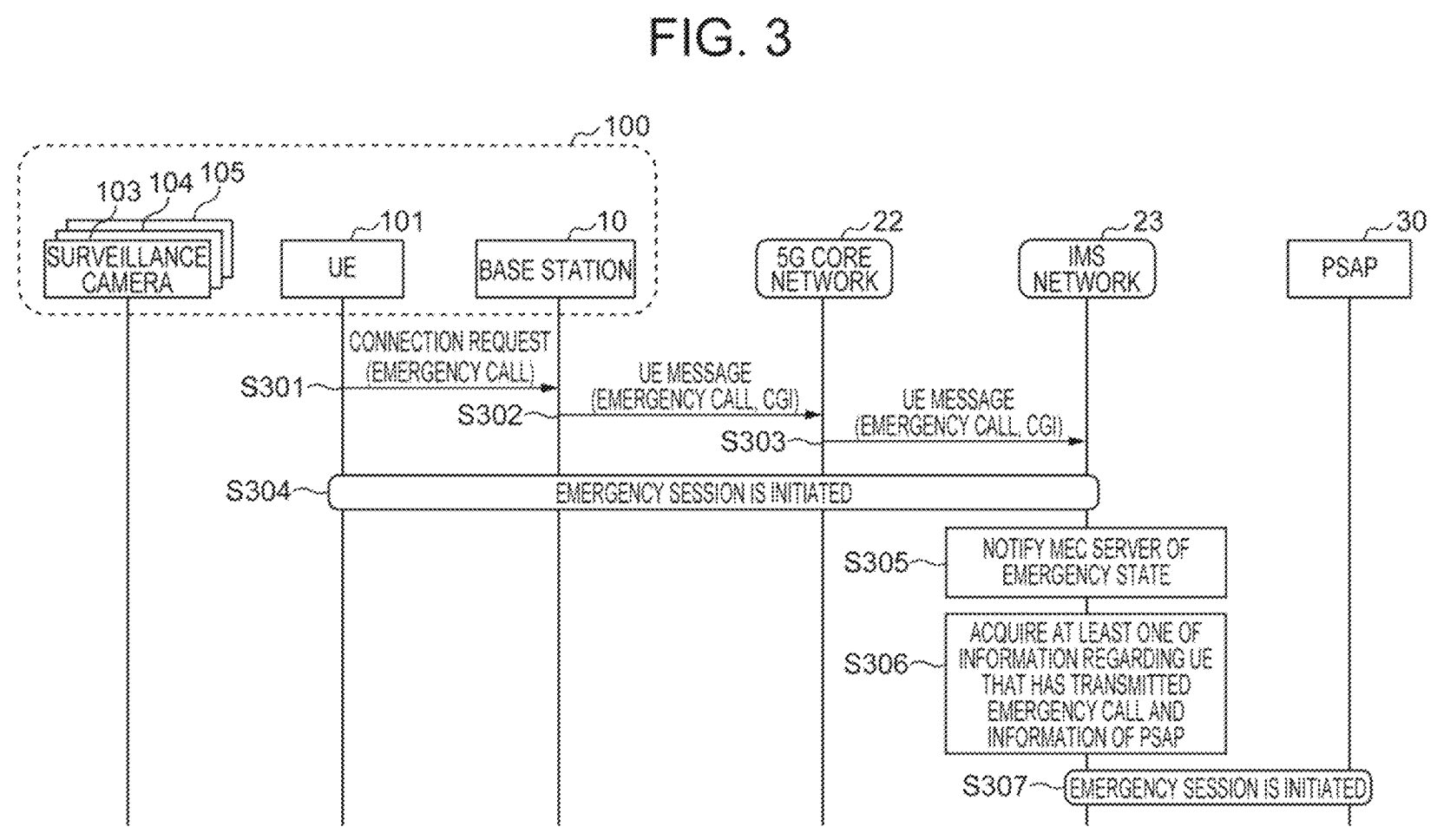
Figure 4:
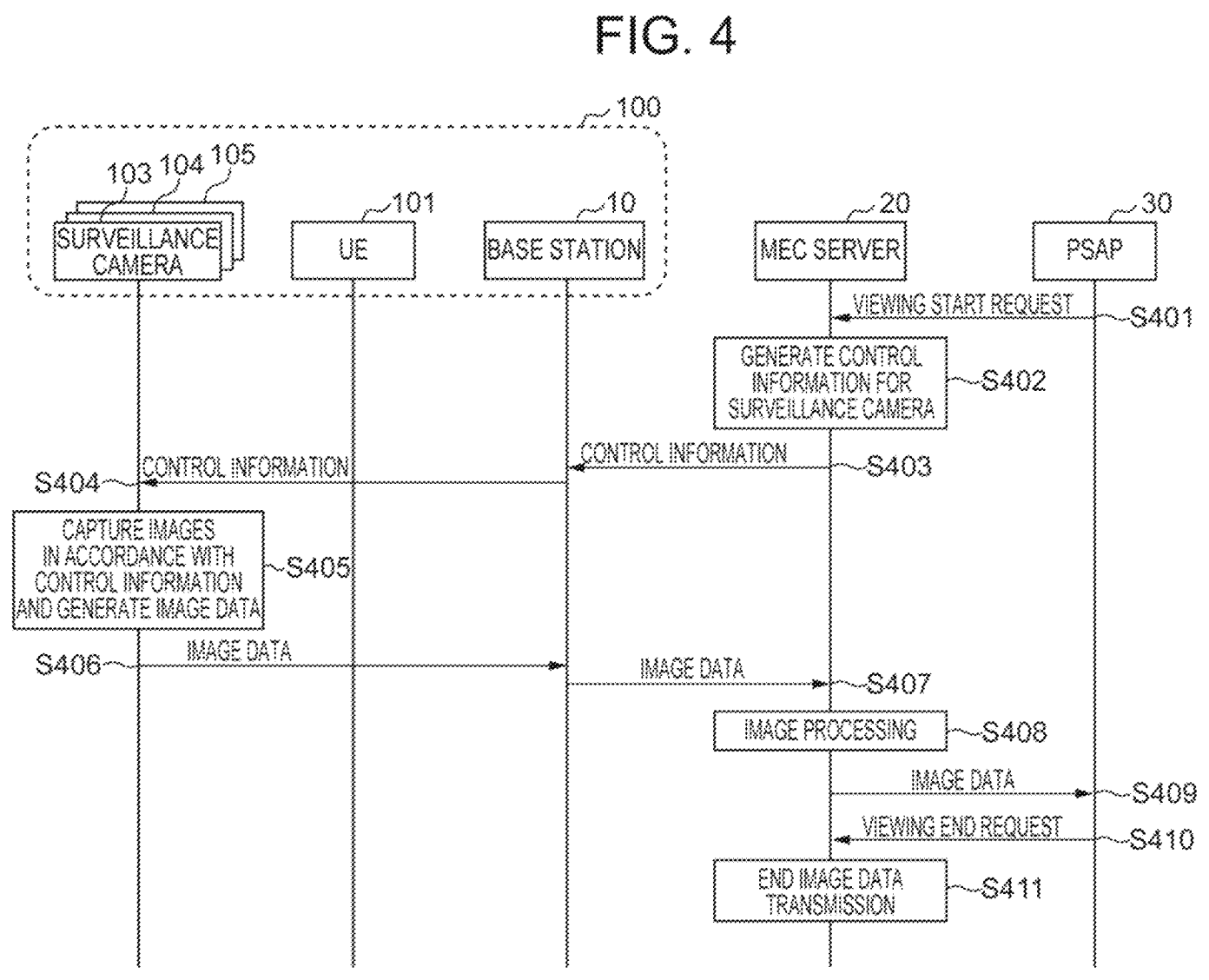

A flow of processing in the communication system 1 when the MEC server 20 controls the surveillance cameras 103 to 105 will be described with reference to FIGS. 3 and 4. FIG. 3 shows a communication sequence for establishing an emergency session when an emergency call is transmitted by the UE 101. FIG. 4 shows a communication sequence when the MEC server 20 acquires images by controlling the surveillance cameras 103 to 105, and transmits the images to the PSAP 30, which is processing performed after the processing shown in FIG. 3.

The configuration shown in FIGS. 1 and 2A is referred to for the description of the communication sequence shown in FIGS. 3 and 4. Note that it is assumed that connection establishment processing for enabling the UE 101 to communicate with the 5G core network 22 via the base station 10 is performed prior to the processing shown in FIG. 3. The connection establishment processing conforming to the 5G standard is performed between the UE 101, the base station 10, and the 5G core network 22. Also, the 5G core network 22 may communicate with the IMS network 23 (specifically, IMS 233). Also, it is assumed that the base station 10 and the MEC server 20 manage the pieces of camera information (information such as a position, an imageable range, and an imaging magnification range) of the surveillance cameras 103 to 105 in association with the pieces of identification information of the respective cameras, as described above.

In step S301, when the UE 101 has transmitted an emergency call by an operation performed by a user of the UE 101, a connection request (RRC Connection Request) is transmitted from the UE 101 to the base station 10. The connection request includes information indicating an emergency call (emergency state) (Establishment cause=Emergency Call). At a stage of receiving the connection request (S301) from the UE 101, the base station 10 can recognize that the UE 101 that has transmitted the emergency call belongs to the cell 100.

The base station 10 that has received the connection request from the UE 101 transmits a UE message (Initial UE message) to the 5G core network 22 (S302), and the 5G core network 22 transmits the UE message to the IMS network 23 (S303). The UE message includes information indicating an emergency call (emergency state) (Establishment cause=Emergency Call). Also, the UE message includes information for identifying the cell 100 formed by the base station 10 that has received a signal indicating issuance of an emergency call (CGI (Cell Global Identity)).

When the IMS network 23 receives the UE message from the base station 10, an emergency session is initiated (S304). As a result of the processing until step S304, the 5G core network 22 can recognize that an emergency call has been transmitted in the cell 100, and the cell 100 is the area to be captured. Also, the 5G core network 22 notifies the MEC server 20 of the emergency state in the cell 100 (S305). For example, the 5G network 22 transmits information indicating the emergency state that includes CGI of the cell 100 to the MEC server 20. In step S305, the MEC server 20 can recognize that the cell 100 is the area to be captured (area to be surveyed) by the notification. Also, the MEC server 20 that has received the notification may also transmit the identification information of the MEC server 20 to the PSAP 20.

After starting the emergency session, furthermore, the IMS network 23 acquires at least one of information regarding the UE 101 that has transmitted the emergency call and information regarding the PSAP 30 (S306). The information regarding the UE 101 includes position information of the UE 101, and the information regarding the PSAP 20 may include information regarding routing to the PSAP 20. The IMS network 23 can acquire at least one of the information regarding the UE 101 and the information regarding the PSAP 30 via an unshown LRF (Location Retrieval Function) connected to the IMS network 23. The IMS network 23 searches for a suitable PSAP in a predetermined database based on the acquired information, and in the present embodiment, an emergency session with the retrieved PSAP 30 is initiated (established) (S307). In such a state, the PSAP 30 may acquire information regarding a surveillance target (a moving object or a still object) from the UE 101. The PSAP 30 may also acquire information regarding a telephone number of the UE 101. Also, the PSAP 30 may acquire information regarding the MEC server 20.

Next, description is given with respect to FIG. 4. The processing shown in FIG. 4 is started after an emergency session has been started in step S307 in FIG. 3. When the PSAP 30 attempts to check captured images in the cell 100 (that is, the area to be captured) in response to the emergency call from the UE 101, the PSAP 30 transmits a viewing start request to the MEC server 20, and the MEC server 20 receives the viewing start request (S401). Note that the timing at which the PSAP 30 transmits a viewing start request in step S401 is not limited to the timing shown in FIG. 4, and may be any timing after an emergency session has been started in step S307 in FIG. 3. The viewing start request may also include information regarding the surveillance target (a moving object or a still object). Alternatively, the information regarding the surveillance target may be information received from the UE 101, or may also be information regarding a surveillance target that the PSAP 30 has in advance (e.g., image information).

The MEC server 20 generates control information for the surveillance cameras 103 to 105 connected to the base station 10 (S402). For example, the MEC server 20 specifies the base station 10 based on the CGI of the cell 100 that the 5G core network 22 has received in step S302 in FIG. 3, and furthermore specifies the surveillance cameras 103 to 105 connected to the base station 10. Also, the MEC server 20 generates control information including an instruction to at least one of the surveillance cameras 103 to 105. The instruction may be "start", "capturing start", or the like. Alternatively, or additionally, when the viewing start request received in step S401 includes information regarding the surveillance target, the MEC server 20 may also generate control information for performing control to track the surveillance target. Alternatively, or additionally, the MEC server 20 may also generate control information for controlling capturing. For example, the control information may be for controlling the imaging direction such as panning and tilting, or may also be for controlling the imaging magnification (zoom).

Alternatively, or additionally, the MEC server 20 may select (in other words, narrow down) at least one of the surveillance cameras 103 to 105 to be used, and generate control information including instructions for performing control as described above to the selected surveillance camera. For example, when the MEC server 20 has acquired detailed position information of the UE 101 via the base station 10, the MEC server 20 may select a surveillance camera positionally closest to the UE 101, from the surveillance cameras 103 to 105, and generate control information including instructions to start and control the imaging direction.

The MEC server 20 transmits the generated control information to the base station 10 (S403), and the base station 10 transfers the control information to the surveillance cameras 103 to 105 (S404). Here, when the surveillance camera to be used is selected, the MEC server 20 transmits the control information to the selected surveillance camera (steps S403 and S404).

The surveillance cameras 103 to 105 capture images in accordance with the control information received in step S404, and generate image data (S405). Next, the surveillance cameras 103 to 105 transmit the generated image data to the base station 10 (S406), and the base station 10 transfers the image data to the MEC server 20 (S407).

When at least one of the surveillance cameras 103 to 105 is connected to the base station 10 via a communication apparatus, in step S402, the MEC server 20 generates control information for performing control on the surveillance camera, and transmits the control information to the communication apparatus (steps S403 and S404). The communication apparatus that has received the control information transmits the control information to the connected surveillance camera, and performs control such that the surveillance camera captures images in accordance with the control information and generates image data. The image data generated by the surveillance camera is transmitted to the base station 10 via the communication apparatus (S406).

Upon acquiring image data from the surveillance cameras 103 to 105 via the base station 10, the MEC server 20 performs image processing on the image data (S408). For example, the MEC server 20 performs, on the acquired image data, recognition processing such as object recognition, object detection, face recognition, or character recognition, and image processing such as changing the data size or changing the resolution. Note that the image processing in step S408 may also be optional processing.

Next, the MEC server 20 transmits the image data (subjected to the image processing) to the PSAP 30 (S409). Here, the configuration may also be such that the MEC server 20 generates a URL (Uniform Resource Locator) for the PSAP 30 that has transmitted the viewing start request to view the images acquired by the MEC server 20, and notifies the PSAP 30 of the URL. In such a case, the PSAP 30 that has received the URL can view the images captured by the surveillance cameras 103 to 105 by accessing the URL. Note that the device to which the MEC server 20 transmits image data is not limited to the PSAP 30, and the MEC server 20 may transmit image data to an external apparatus connected to the network 200. For example, when the device to which the captured images are to be transmitted is designated in the viewing start request received by the PSAP 30 (S401), the MEC server 20 may transmit image data to the designated device.

Until a viewing end request is received from the PSAP 30 (S410), the MEC server 20 continues processing from step S407 to step S409. Note that when the MEC server 20 receives further instruction such as an instruction regarding the surveillance target from the PSAP 30, the MEC server 20 generates additional control information (S402), and transmits the additional control information (steps S403 and S404). In response thereto, the surveillance cameras 103 to 105 capture images in accordance with the additional control information, generate image data (S405), and transmit the image data to the PSAP 30 via the MEC server 20 (steps S406 to S409).

Thereafter, upon receiving a viewing end request from the PSAP 30 (S410), the MEC server 20 ends transmission of image data to the PSAP 30 (S411). Here, the MEC server 20 may also request the surveillance cameras 103 to 105 to stop capturing and generating image data in accordance with the control information transmitted in step S405.

Note that when the PSAP 30 has acquired identification information of the MEC server 20, even if a plurality of MEC servers including the MEC server 20 are present in the network 200, the PSAP 20 can quickly specify the MEC server 20 and transmit a viewing start request (S401). Accordingly, without performing an exhaustive search through the plurality of MEC servers, the PSAP 20 can exclusively access the MEC server 20 and view an image group acquired by the MEC server 20.

Flow of Processing (When Management Apparatus Controls Surveillance Cameras Via MEC Server)

Figure 5:
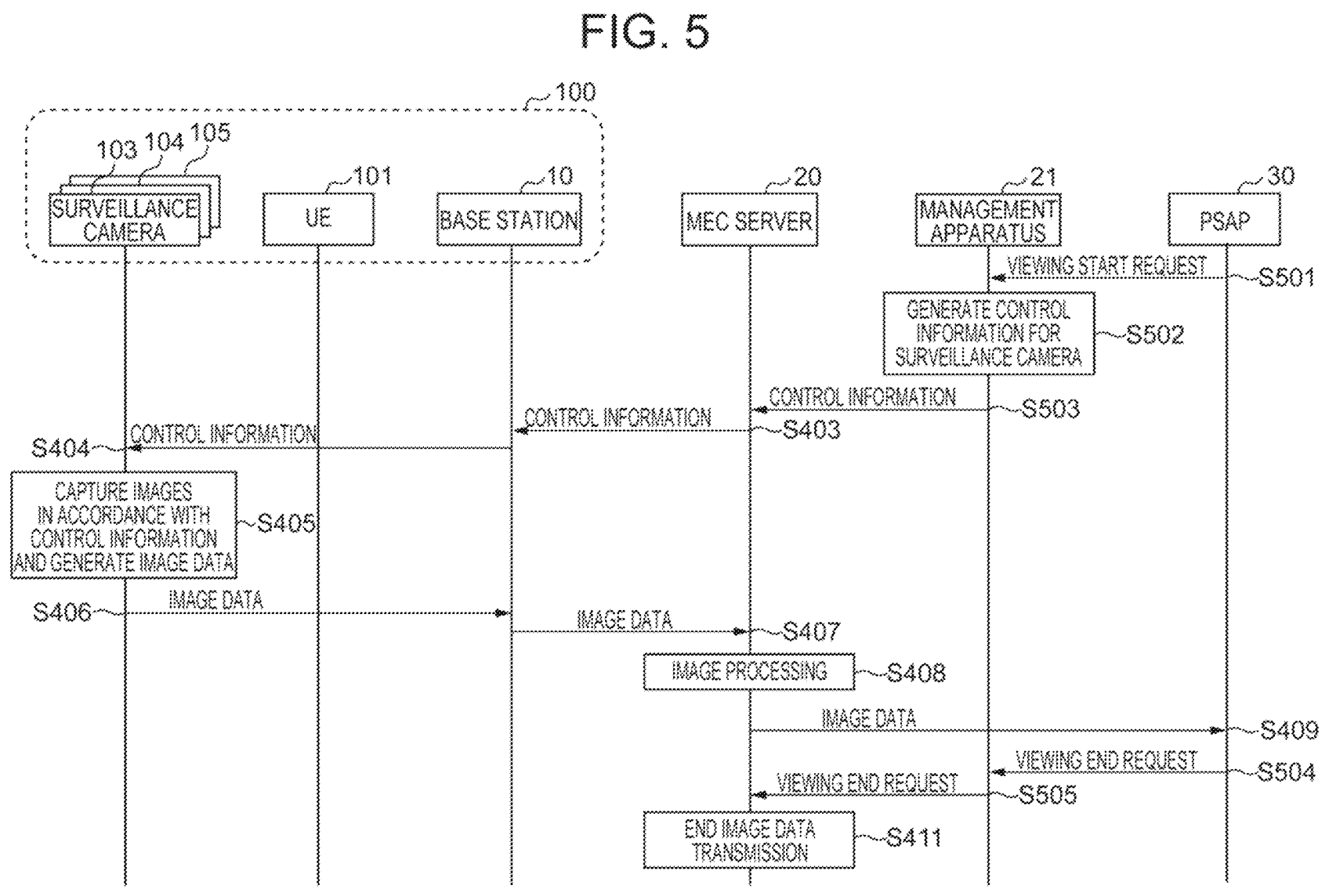

A flow of processing in the communication system 1 when the management apparatus 21 controls the surveillance cameras 103 to 105 via the MEC server 20 will be described with reference to FIGS. 3 and 5. FIG. 5 shows a communication sequence when the MEC server 20 performs control such that the management apparatus 21 acquires images by controlling the surveillance cameras 103 to 105, and transmits the images to the PSAP 30, which is processing performed after the processing shown in FIG. 3.

The description of FIG. 3 is as described above. Note that, in FIG. 3, after step S304, the 5G core network 22 notifies the management apparatus 21 of the emergency state in the cell 100 (S305). Specifically, the 5G network 22 notifies the management apparatus 21 of the fact that an emergency call has been transmitted in the cell 100 and the cell 100 is the area to be captured. The management apparatus 21 receives the notification, and can recognize that the cell 100 is the area to be captured (area to be surveyed). Also, the management apparatus 21 that has received the notification may also transmit identification information of the MEC server 20 under management to the PSAP 20.

Next, a description is given with respect to FIG. 5. The processing shown in FIG. 5 is started after an emergency session has been started in step S307 in FIG. 3. Note that the processing similar to that of FIG. 4 is given the same reference numeral, and the description thereof is omitted. When the PSAP 30 attempts to check captured images in the cell 100 (that is, the area to be captured) in response to an emergency call from the UE 101, the PSAP 30 transmits a viewing start request to the management apparatus 21, and the management apparatus 21 receives the viewing start request (S501). Note that the timing at which the PSAP 30 transmits a viewing start request in step S501 is not limited to the timing shown in FIG. 5, and may be any timing after an emergency session has been started in step S306 in FIG. 3. The viewing start request may also include information (image information) regarding the surveillance target (a moving object or a still object). Alternatively, the management apparatus 21 may also acquire information regarding the surveillance target by an input made by an operator of the management apparatus 21.

The management apparatus 21 generates control information for the surveillance cameras 103 to 105 connected to the base station 10 (S502). The control information generated here is similar to the control information generated in step S402 in FIG. 3. The management apparatus 21 transmits the generated control information to the MEC server 20 (S503), the MEC server 20 transmits the control information to the base station 10 (S403), and the base station 10 transmits the control information to the surveillance cameras 103 to 105 (S404). The processing from step S405 to step S409 is similar to that of FIG. 4.

Upon receiving a viewing end request from the PSAP 30 (S504), the management apparatus 21 transfers the viewing end request to the MEC server 20 (S505). The MEC server 20 that has received the viewing end request ends transmission of image data to the PSAP 30 (S411). Here, the management apparatus 21 may also request the surveillance cameras 103 to 105 to stop capturing in accordance with control information transmitted in step S503 and generating image data.

In FIG. 5, the image processing in step S408 is performed by the MEC server 20, but the processing may also be performed by the management apparatus 21. For example, the management apparatus 21 may acquire image data generated by the surveillance cameras 103 to 105, perform image processing on the image data, and transmit the image data subjected to the image processing to the PSAP 30.

Also, when the PSAP 30 has acquired identification information of the MEC server 20, even if a plurality of MEC servers including the MEC server 20 are present in the network 200, the PSAP 30 can quickly specify the MEC server 20 and transmit a viewing start request in which the MEC server 20 is designated (S501). Accordingly, without performing an exhaustive search through the plurality of MEC servers, the PSAP 30 can exclusively access the MEC server 20 and view an image group acquired by the MEC server 20.

As described above, according to the present embodiment, information indicating an emergency state is transmitted from the base station 10 to the 5G core network 22, the processing being triggered by an emergency call transmitted by a UE positioned in the cell 100 to the base station 10. Thereafter, information indicating the emergency state is transmitted from the 5G core network 22 to the MEC server 20 or the management apparatus 21, and as a result, the MEC server 20 or the management apparatus 21 can specify surveillance cameras 103 to 105 that are managed by the base station 10, and control the surveillance cameras to perform image capturing. That is, in response to issuance of an emergency call in a wireless access network, information for specifying a cell 100 that is obtained in the wireless access network can be acquired, and surveillance cameras 103 to 105 that are under management in the cell 100 can be controlled. Furthermore, the MEC server 20 or the management apparatus 21 can perform control such that images captured by the surveillance cameras are transmitted to a PSAP 30 in response to a request from the PSAP 30. With the processing procedure in the communication system 1, surveillance cameras 103 to 105 in a cell 100 in which an emergency call has been transmitted are quickly and appropriately specified, and a PSAP 30 can check images captured by the surveillance cameras 103 to 105 in real time.

First Modification

In the embodiment described above, upon receiving control information from a MEC server 20 or a management apparatus 21 that has received viewing start request from a PSAP 30, surveillance cameras 103 to 105 capture images in accordance with the control information, and generate image data. Alternatively, the MEC server 20 or the management apparatus 21 may also generate control information, after step S305 in FIG. 3, and transmit the control information to the surveillance cameras 103 to 105. The MEC server 20 or the management apparatus 21 has recognized the area to be captured at a stage of step S305 in FIG. 3, and therefore may generate control information for starting the surveillance cameras 103 to 105 and transmit the control information to the surveillance cameras 103 to 105, for example.

Second Modification

In the embodiment described above, a MEC server 20 performs control such that images (image data) captured by surveillance cameras 103 to 105 that are connected to a base station 10 to which a UE 101 is connected are transmitted to a network 200, the control being started by an emergency call transmitted by the UE 101 positioned in a cell 100, as a trigger. The trigger is not limited to the emergency call from a UE positioned in the cell 100.

For example, a configuration may also be adopted in which when at least one of the surveillance cameras 103 to 105 has detected an anomaly, an anomaly message (signal) indicating the anomaly is transmitted to the base station 10 instead of the emergency call. The base station 10 interprets the anomaly message as an emergency call, and transmits a UE message to a 5G core network 22 (S302 in FIG. 3), and thereafter processing shown in FIG. 3 and FIG. 4 or FIG. 5 is performed in the communication system 1. The surveillance cameras 103 to 105 store many motions specific to suspicious persons in advance, compare the motion of a person detected in the captured images with the stored motions, and detect an anomaly when the motions match at a given ratio or more, for example.

Alternatively, control to transmit images captured by the surveillance cameras 103 to 105 to the network 200 may also be performed upon being triggered by the base station 10 itself having detected an anomaly. For example, when at least one of the change in wireless conditions (e.g., received power), the received radio wave, and a reflected wave has increased to a preset level or more, the base station 10 detects an anomaly. Upon detecting an anomaly, the base station 10 transmits a UE message to the 5G core network 22 (S302 in FIG. 3), and thereafter processing shown in FIG. 3 and FIG. 4 or FIG. 5 is performed in the communication system 1.

Second Embodiment

In the first embodiment, network management has been described for utilizing images captured by the surveillance cameras 130 to 150 in the cell 100, in the communication system 1 including the base station 10 that forms the cell 100 and the MEC server 20 connected to the base station 10. In the present embodiment, network management will be described such that, in a communication system including a plurality of base stations that form a plurality of cells, and a plurality of MEC servers that are connected to the plurality of base stations, the plurality of MEC servers can operate in a cooperative manner. The configurations and features different from those of the first embodiment will be described. Note that the modifications described above can also be applied to the present embodiment.

Figure 6:
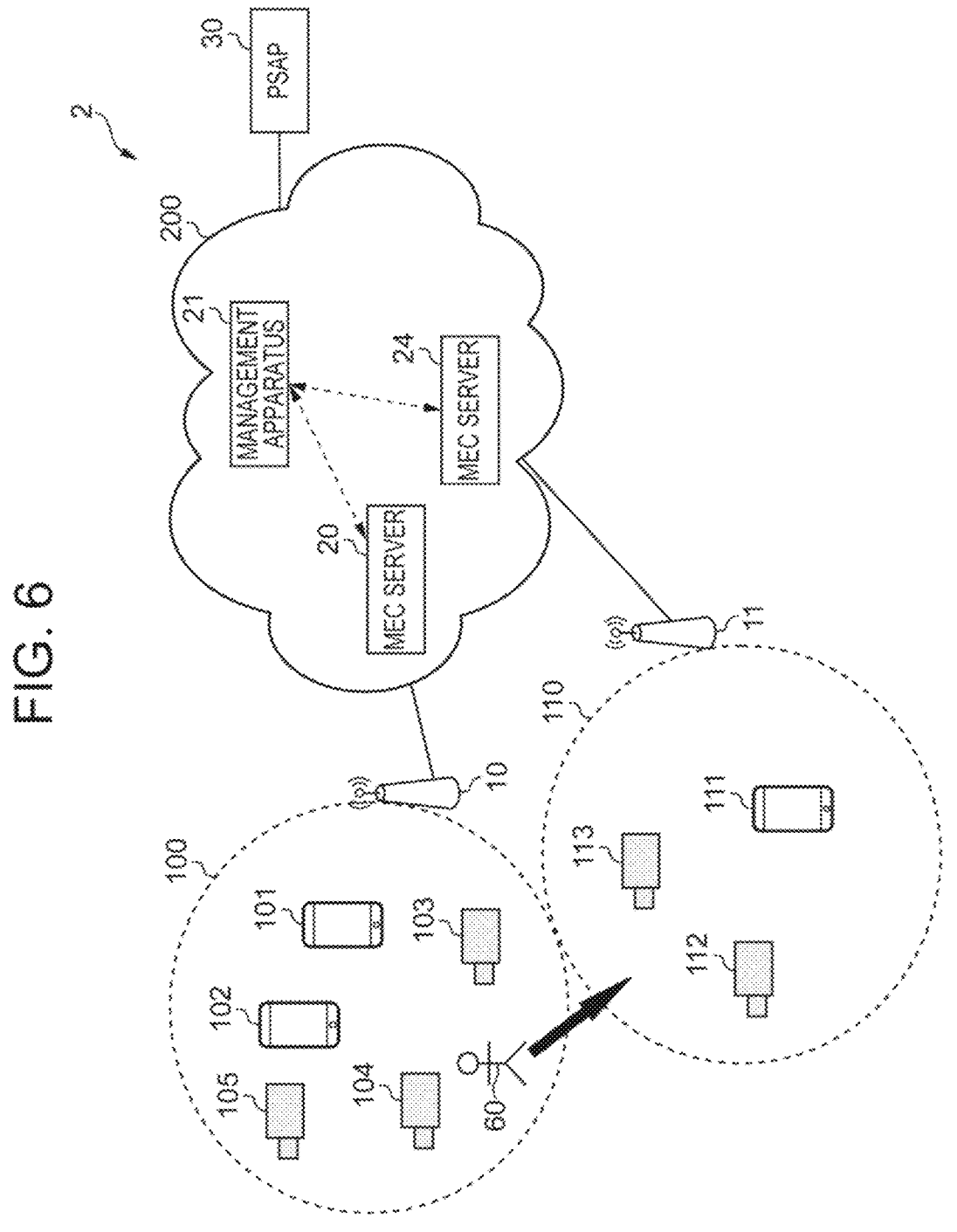
FIG. 6 shows an exemplary configuration of a communication system according to a second embodiment.

FIG. 6 shows an exemplary configuration of a communication system 2 according to the present embodiment. In the communication system 2, a base station 11 that forms a cell 110 and a MEC server 24 connected to the base station 11 are added to the communication system 1 in FIG. 1, which has been described in the first embodiment. Furthermore, a UE 111 and surveillance cameras 112 and 113 are present in the cell 110, and the UE 111 and the surveillance cameras 112 and 113 may communicate with the base station 11. The MEC server 24 has functions similar to those of the MEC server 20, and is arranged in the network 200.

In the present embodiment, a management apparatus 21 may manage the MEC server 20 and the MEC server 24. For example, the management apparatus 21 monitors the processing loads of the MEC server 20 and the MEC server 24, and when the processing load of one MEC server has exceeded a predetermined level, some of processing of the MEC server is assigned to the other MEC server (offloading). In order for the management apparatus 21 to monitor the processing loads of the MEC server 20 and the MEC server 24, the MEC server 20 and the MEC server 24 may each regularly transmit information regarding the processing load to the management apparatus 21, for example. Alternatively, the MEC server 20 and the MEC server 24 may transmit information regarding the processing load to the management apparatus 21, in accordance with a request from the management apparatus 21.

Alternatively, or additionally, when the surveillance target moves across the cell 100 and the cell 110, the management apparatus 21 may also perform control to switch the MEC server that controls surveillance cameras. For example, when a UE 101 positioned in the cell 100 has found a suspicious person 60 and transmitted an emergency call, and the suspicious person 60 is specified as a surveillance target by information from a user of the UE 101 or preset information, the management apparatus 21 controls the MEC server 20 and the MEC server 24 such that a plurality of surveillance cameras positioned in the cell 100 and cell 110 can continuously perform capturing. In the example in FIG. 6, while the suspicious person 60 is present in the cell 100, the MEC server 21 controls the surveillance cameras 103 to 105, and when the suspicious person 60 moves from the cell 100 and enters the cell 110, the MEC server 24 controls the surveillance cameras 112 and 113. Information regarding the movement of the suspicious person 60 is transmitted from the base station 10 and the base station 11 to the MEC server 20 and the MEC server 24, respectively. Accordingly, while the suspicious person 60 is present in the cell 100, the MEC server 20 can acquire images captured by the surveillance cameras 103 to 105, and while the suspicious person 60 is present in the cell 110, the MEC server 24 can acquire images captured by the surveillance cameras 111 and 112. Also, the management apparatus 21 transmits images acquired by the MEC server 20 and the MEC server 24 to the PSAP 30, and as a result, the PSAP 30 can check, in real time, images captured in the cell 100 and the cell 110.

As described above, in the present embodiment, the management apparatus 21 performs control such that the MEC server 20 and the MEC server 24 operate in a cooperative manner. Accordingly, a plurality of MEC servers can be controlled such that the loads in the MEC servers can be efficiently distributed, and even if a surveillance target has moved, images of the surveillance target can be continuously acquired, and as a result, the processing loads can be efficiently distributed, and images captured by tracking a surveillance target can be generated in real time.

Hardware Configurations of MEC Server and Management Apparatus

Figure 7:
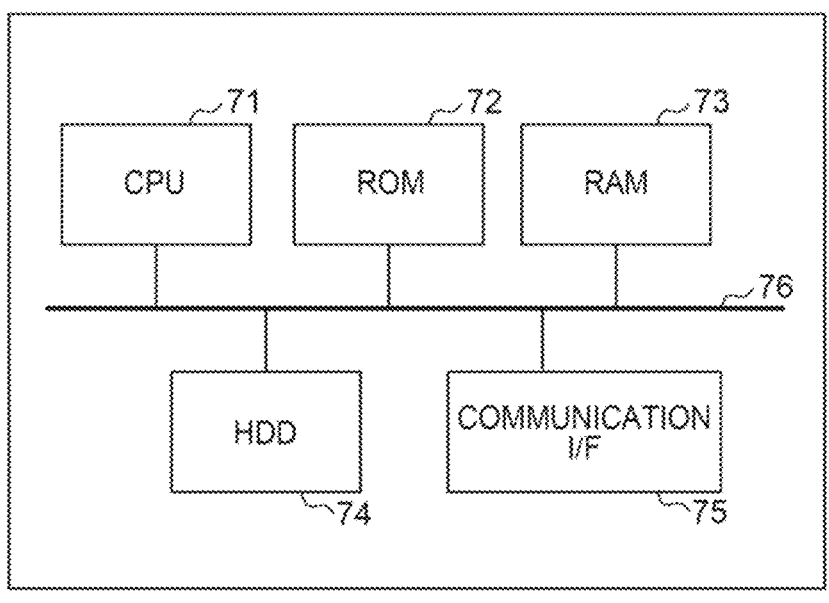
FIG. 7 shows an exemplary hardware configuration of the MEC server and the management apparatus.

FIG. 7 shows an exemplary hardware configuration of the MEC server 20 according to the embodiments and modifications described above. Note that the management apparatus 21 and the MEC server 24 also have similar hardware configurations.

As shown in FIG. 7, the MEC server 20 includes a CPU (Central Processing Unit) 71, a ROM (Read Only Memory) 72, a RAM (Random Access Memory) 73, an HDD (Hard Disk Drive) 74, a communication I/F (Interface) 75, and a system bus 76, as an example of the hardware configuration. The MEC server 20 may also include an external memory.

The CPU 71 is constituted by one or more processors and controls the operations of the MEC server 20 in an integrated manner. The CPU 71 controls the constituent elements (72 to 75) via the system bus 76, which is a data transmission path. At least one of the at least one CPU 71 may be replaced by one or more processors such as an ASIC (Application-Specific Integrated Circuit), an FPGA (Field Programmable Gate Array), a DSP (Digital Signal Processor), and a GPU (Graphics Processing Unit).

The ROM 72 is a non-volatile memory that stores control programs and the like necessary for the CPU 71 to execute processing. Note that the programs may be stored in a non-volatile memory such as the HDD 74 or an SSD (Solid State Drive) or an external memory such as a removable storage medium (not shown).

The RAM 73 is a volatile memory and functions as a main memory of the CPU 71, a work area, and the like. That is, the CPU 71 loads necessary programs and the like from the ROM 72 to the RAM 73 when executing processing, and realizes various functional operations by executing the programs and the like.

The HDD 74 stores, for example, various types of data, information, and the like necessary for the CPU 71 to perform processing using a program. Also, the HDD 74 stores various types of data, information, and the like obtained by the CPU 71 performing processing using a program or the like, for example. Note that the storage may be performed, either together with or instead of the HDD 74, using a non-volatile memory such as an SSD or an external memory such as a removable storage medium.

The communication I/F 75 is an interface for controlling communication between the MEC server 20 and an external apparatus.

Note that the MEC server 20 may have dedicated hardware for executing functions of the respective constituent elements, or may execute some of the functions by hardware and execute the rest with the computer that runs the program. Also, all functions may be performed by a computer and programs. The same applies to the management apparatus 21 and the MEC server 24.

Functional Configuration of MEC Server

Figure 8:
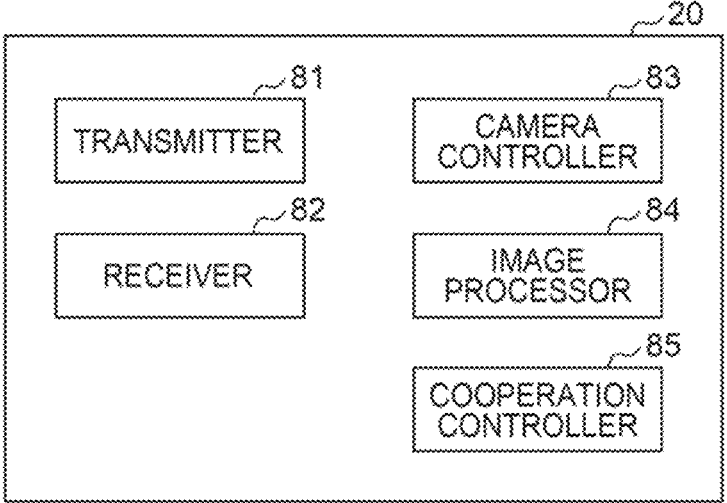
FIG. 8 shows an exemplary functional configuration of the MEC server.

FIG. 8 shows an exemplary functional configuration of the MEC server 20 according to the present embodiments. The MEC server 24 also has a similar functional configuration. The functions of the MEC server 20 are logical functions realized by hardware of the MEC server 20 shown in FIG. 7, and are realized by the CPU 71 executing programs stored in the ROM 72 or the like. In the present embodiment, the MEC server 20 includes a transmitter 81, a receiver 82, a camera controller 83, an image processor 84, and a cooperation controller 85, as functional constituent elements.

The transmitter 81 and the receiver 82 respectively perform transmission and reception of packets via the communication I/F 85. In the present embodiment, the packets include packets including image data and packets including control information for controlling the surveillance cameras 103 to 105. The camera controller 83 generates control information for controlling the surveillance cameras 103 to 105 that can communicate with the base station 10 to be connected to the MEC server 20 (in the case of the MEC server 24, the surveillance cameras 111 and 112 that can communicate with the base station 11) (corresponding to the processing in step S402 in FIG. 4). For example, the camera controller 303 may select (narrow down) a surveillance camera, from the surveillance cameras 103 to 105, that is positionally close to the UE 101 that has transmitted an emergency call, and generate control information including an instruction to start the surveillance camera. That is, the camera controller 83 may generate control information including an instruction to start the surveillance camera, of the surveillance cameras 103 to 105, that is installed close to the place where an emergency state has occurred. Alternatively, or additionally, when the camera controller 83 has acquired information regarding the surveillance target, the camera controller 83 may generate control information for performing control such that the surveillance target is tracked. Alternatively, or additionally, the camera controller 83 may also generate control information for controlling an imaging direction (panning and tilting) and an imaging magnification (zoom).

The image processor 84 performs image processing on the images (image data) acquired from the surveillance cameras 103 to 105 (corresponding to processing in step S408 in FIG. 4). For example, the image processor 84 may perform, on the images, image recognition processing such as object recognition, object detection, face recognition, or character recognition, and image processing such as changing the data size or changing the resolution. The image recognition processing may be image recognition processing using an AI (artificial intelligence). For example, the image processor 84 may extract, when the image processor 84 has acquired an image of the surveillance target, an object similar to the surveillance target (e.g., having common features) from the images obtained from the surveillance cameras 103 to 105.

The cooperation controller 85 performs control when operating with another MEC server in a cooperative manner, as described in the second embodiment. For example, the cooperation controller 85 may perform control for acquiring information regarding the processing load of the MEC server 20 and transmitting the information to the management apparatus 21. The cooperation controller 85 may also perform control for, upon receiving information indicating that the surveillance target is moving from the cell 100 to the cell 110 from the base station 10, transmitting the information regarding the movement to the management apparatus 21.

Functional Configuration of Management Apparatus

Figure 9:
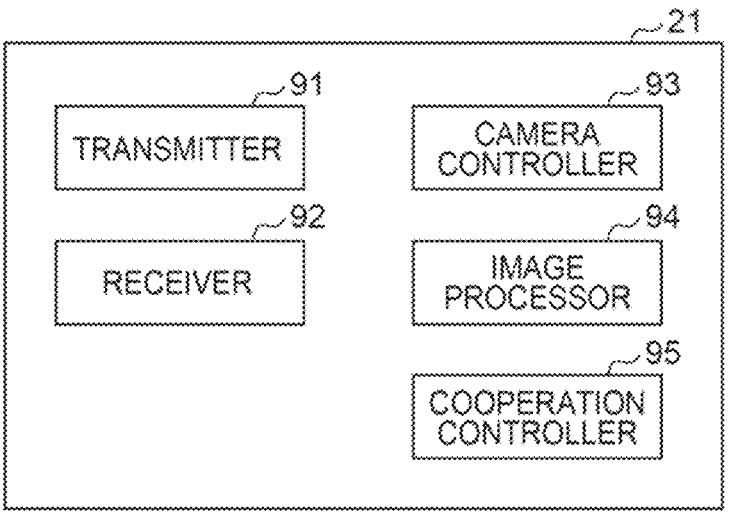
FIG. 9 shows an exemplary functional configuration of the management apparatus.

FIG. 9 shows an exemplary functional configuration of the management apparatus 21 according to the present embodiment. The functions of the management apparatus 21 are logical functions realized by hardware of the management apparatus 21 shown in FIG. 7, and are realized by the CPU 71 executing programs stored in the ROM 72 or the like. In the present embodiment, the management apparatus 21 includes a transmitter 91, a receiver 92, a camera controller 93, an image processor 94, and a cooperation controller 96, as functional constituent elements.

The transmitter 91, receiver 92, camera controller 93, and image processor 94 respectively have functions similar to those of the transmitter 81, receiver 82, camera controller 83, and image processor 84 of the MEC server 20 in FIG. 8. The cooperation controller 96 performs control such that a plurality of MEC servers operate in a cooperative manner, as described in the second embodiment. For example, upon receiving information regarding the processing load of the MEC server 20 from the MEC server 20, the cooperation controller 96 may instruct the MEC server 24 to execute some of the loads (offloading). Also, upon receiving information indicating that the surveillance target is moving from the cell 100 to the cell 110 from the MEC server 20, the cooperation controller 95 may also instruct the MEC server 24 to control the surveillance cameras managed by the MEC server 24.

It should be noted that although specific embodiments have been described above, the embodiments are merely examples and are not intended to limit the scope of the present disclosure. The apparatus and methods described in this specification may be embodied in forms other than those described above. Also, appropriate omissions, substitutions, and modifications may be made to the above-described embodiments without departing from the scope of the present disclosure. Such omissions, substitutions and modifications are included in the scope of the claims and their equivalents, and are within the technical scope of the present disclosure.

EMBODIMENTS OF THE PRESENT DISCLOSURE

The present disclosure includes the following embodiments.

[1] An edge server including one or more processors, in which at least one of the one or more processors executes: reception processing for receiving, from a base station that has detected an emergency state, information indicating the emergency state via a core network connected to the base station: control processing for controlling, upon receiving information indicating the emergency state, one or more surveillance cameras connected to the base station; and image transmission processing for transmitting images captured by the one or more surveillance cameras to an external apparatus via the core network.

[2] The edge server according to [1], in which the reception processing includes receiving information indicating the emergency state from the base station that has detected the emergency state by having received a signal indicating issuance of an emergency call transmitted by a user equipment.

[3] The edge server according to [1] or [2], in which the reception processing includes receiving information indicating the emergency state from the base station that has detected the emergency state by having received a message indicating an anomaly from at least one of the one or more surveillance cameras.

[4] The edge server according to any one of [1] to [3], in which the reception processing includes receiving information indicating the emergency state from the base station that has detected the emergency state by having detected that at least one of a change in a wireless condition, a radio wave, and a reflected wave exceeded a predetermined level.

[5] The edge server according to any one of [1] to [4], in which the control processing includes at least one of starting at least one of the one or more surveillance cameras, controlling an imaging direction, and controlling an imaging magnification.

[6] The edge server according to any one of [1] to [5], in which the control processing includes selecting and controlling any of the one or more surveillance cameras.

[7] The edge server according to [6], the control processing includes, when position information of a place at which the emergency state has occurred has been received from the base station, selecting a surveillance camera, from the one or more surveillance cameras, that is installed closest to the place at which the emergency state has occurred.

[8] The edge server according to any one of [1] to [7], in which at least one of the one or more processors further executes identification information transmission processing for transmitting, to the external apparatus, identification information of the edge server for identifying the edge server from a plurality of edge servers connected to the core network.

[9] The edge server according to any one of [1] to [8], in which the external apparatus is a public safety answering point (PSAP).

[10] A management apparatus including one or more processors, in which at least one of the one or more processors executes: reception processing for receiving, from a base station that has detected an emergency state, information indicating the emergency state via a core network connected to the base station: camera control processing for controlling, upon receiving information indicating the emergency state, an edge server connected to the base station to control one or more surveillance cameras connected to the base station; and image transmission processing for transmitting images captured by the one or more surveillance cameras to an external apparatus connected to the core network.

[11] The management apparatus according to [9], in which the control processing further includes performing control such that one or more surveillance cameras connected to another base station different from the base station are controlled.

[12] The management apparatus according to [9] or [10], in which at least one of the one or more processors further executes monitoring processing for monitoring a processing load of the edge server; and offloading control processing for performing offloading control for, when the processing load has exceeded a predetermined level, offloading some processing being executed by the edge server onto another edge server different from the edge server.

[13] A control method of an edge server including: receiving, from a base station that has detected an emergency state, information indicating the emergency state via a core network connected to the base station: controlling, upon receiving information indicating the emergency state, one or more surveillance cameras connected to the base station; and transmitting images captured by the one or more surveillance cameras to an external apparatus via the core network.

[14] A computer-readable storage medium storing a program, the program including commands for, when executed by one or more processors of an edge server, causing the edge server to execute: reception processing for receiving, from a base station that has detected an emergency state, information indicating the emergency state via a core network connected to the base station: control processing for controlling, upon receiving information indicating the emergency state, one or more surveillance cameras connected to the base station; and image transmission processing for transmitting images captured by the one or more surveillance cameras to an external apparatus via the core network.

[15] A computer-readable storage medium storing a program, the program including commands for, when executed by one or more processors of a management apparatus, causing the management apparatus to execute: reception processing for receiving, from a base station that has detected an emergency state, information indicating the emergency state via a core network connected to the base station; camera control processing for controlling, upon receiving information indicating the emergency state, an edge server connected to the base station to control one or more surveillance cameras connected to the base station; and image transmission processing for transmitting images captured by the one or more surveillance cameras to an external apparatus connected to the core network.

REFERENCE NUMERALS AND SYMBOLS

1; 2: Communication system
10; 11: Base station
100; 110: Cell
101; 102; 111: UE
103; 104; 105; 112; 113: Surveillance camera
20; 24: MEC server
21: Management apparatus
22: 5G core network
23: IMS network
200: Network
30: PSAP
71: CPU
72: ROM
73: RAM
74: HDD

75: Communication I/F
81: Transmitter
82: Receiver
83: Camera controller
84: Image processor
85: Cooperation controller
91: Transmitter
92: Receiver
93: Camera controller
94: Image processor
95: Cooperation controller

The invention claimed is:

1. An edge server in a communication system including a base station that forms a cell by executing at least one function of a Radio Unit (RU) of a Radio Access Network (RAN) and a core network connected to the base station, the edge server being located closer to the base station than the core network, the edge server comprising:

one or more processors,
wherein at least one of the one or more processors executes:

reception processing for receiving, from the base station, information indicating an emergency state via the core network when the base station detects the emergency state based on wireless communication in the cell, wherein the base station has detected the emergency state by having received a signal indicating issuance of an emergency call transmitted and initiated by a user equipment in the cell;

control processing for controlling, upon receiving (i) information indicating the emergency state, (ii) position information of a place at which the emergency state has occurred has been received from the base station, and (iii) camera information of one or more surveillance cameras connected to the base station, selection of a surveillance camera from the one or more surveillance cameras connected to the base station that is installed closest to the place at which the emergency state has occurred; and image transmission processing for transmitting images captured by the selected surveillance camera to an external apparatus via the core network.

2. The edge server according to claim 1, wherein the reception processing includes receiving information indicating the emergency state from the base station that has detected the emergency state by having received a message indicating an anomaly from at least one of the one or more surveillance cameras in the cell.

3. The edge server according to claim 1, wherein the reception processing includes receiving information indicating the emergency state from the base station that has detected the emergency state by having detected that at least one of a change in a wireless condition, a radio wave, and a reflected wave in the cell exceeded a predetermined level.

4. The edge server according to claim 1, wherein the control processing includes at least one of starting at least one of the one or more surveillance cameras in the cell, controlling an imaging direction, and controlling an imaging magnification.

5. The edge server according to claim 1,
wherein at least one of the one or more processors further executes
identification information transmission processing for transmitting, to the external apparatus, identification information of the edge server for identifying the edge server from a plurality of edge servers connected to the core network.

6. The edge server according to claim 1, wherein the external apparatus is a public safety answering point (PSAP).

7. A management apparatus comprising
one or more processors,
wherein at least one of the one or more processors executes:

reception processing for receiving, from a base station that forms a cell by executing at least one function of a Radio Unit (RU) of a Radio Access Network (RAN), information indicating an emergency state via a core network connected to the base station when the base station detects the emergency state based on wireless communication in the cell, wherein the base station has detected the emergency state by having received a signal indicating issuance of an emergency call transmitted and initiated by a user equipment in the cell;

camera control processing for controlling, upon receiving (i) information indicating the emergency state, (ii) position information of a place at which the emergency state has occurred has been received from the base station, and (iii) camera information of one or more surveillance cameras connected to the base station, an edge server that is located closer to the base station than the core network and that connected to the base station to select a surveillance camera from the one or more surveillance cameras that is installed closest to the place at which the emergency state has occurred; and image transmission processing for transmitting images captured by the selected surveillance camera to an external apparatus connected to the core network.

8. The management apparatus according to claim 7, wherein the control processing further includes performing control such that one or more surveillance cameras connected to another base station different from the base station are controlled.

9. The management apparatus according to claim 7, wherein at least one of the one or more processors further executes:

monitoring processing for monitoring a processing load of the edge server; and offloading control processing for performing offloading control for, when the processing load has exceeded a predetermined level, offloading some processing being executed by the edge server onto another edge server different from the edge server.

10. A control method of an edge server in a communication system including a base station that forms a cell by executing at least one function of a Radio Unit (RU) of a Radio Access Network (RAN) and a core network connected to the base station, the edge server being located closer to the base station than the core network, and the control method comprising:

receiving, from the base station, information indicating an emergency state via the core network when the base station detects the emergency state based on wireless communication in the cell, wherein the base station has detected the emergency state by having received a signal indicating issuance of an emergency call transmitted and initiated by a user equipment in the cell;

controlling, upon receiving information (i) indicating the emergency state, (ii) position information of a place at which the emergency state has occurred has been received from the base station, and (iii) camera information of one or more surveillance cameras connected to the base station, selecting a surveillance camera from the one or more surveillance cameras connected to the base station that is installed closest to the place at which the emergency state has occurred; and transmitting images captured by the one or more surveillance cameras to an external apparatus via the core network.

* * * * *